T. W. Brown,
Hat and Coat Hook.

N°. 69,311.    Patented Oct. 1, 1867.

Witnesses:
F. P. Hale Jr.
S. N. Piper

Inventor:
T. W. Brown.
by his attorney
R. H. Eddy

United States Patent Office.

THOMAS W. BROWN, OF NEW YORK, N. Y.

Letters Patent No. 69,311, dated October 1, 1867.

---

IMPROVED HAT AND COAT-RACK.

---

The Schedule referred to in these Letters Patent and making part of the same.

---

TO ALL PERSONS TO WHOM THESE PRESENTS MAY COME:

Be it known that I, THOMAS W. BROWN, of the city, county, and State of New York, have invented an improved or Tri-Pronged Hat and Coat-Hook; and do hereby declare the same to be fully described in the following specification, and represented in the accompanying drawings, of which—

Figure 4:
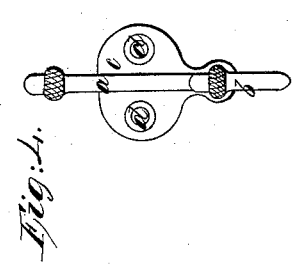
Figure 3:
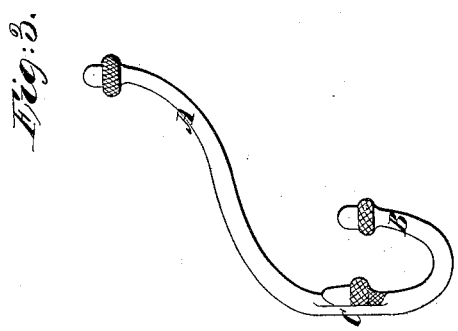
Figure 1:
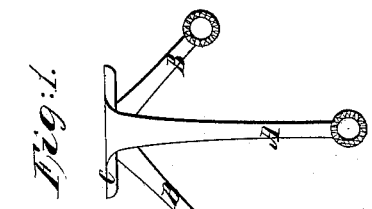
Figure 2:
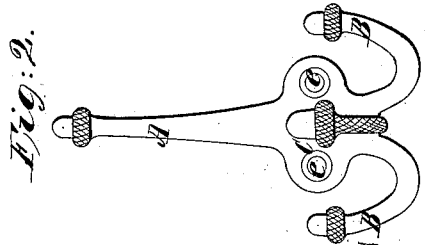

Figure 1 is a top view,
Figure 2 a front elevation, and
Figure 3 a side view of one of the said hooks.
Figure 4 is a front view, and
Figure 5 a side view of a hook as commonly constructed.

Figure 5:
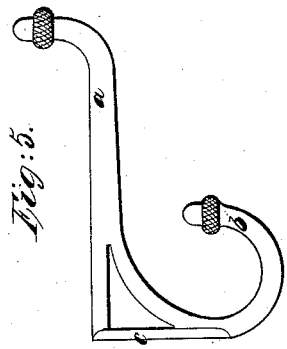

This latter kind of hook has two prongs, $a\ b$, only, which project from a fastening-plate or shoulder, $c$, in manner as represented in the said figs. 4 and 5, the upper or hat prong $a$ being to support the hat, and the other ($b$) the coat of a person when the article or hook is fastened to a wall or other device by screws going through the holes $d\ d$ of the shoulder-plate $c$ of such hook.

It is very difficult, if not impossible, to mould this latter kind of hook so as to cast it of metal with the holes $d\ d$ in its plate $c$. My improved hook can be so cast, and furthermore, when made to the best advantage, it has an additional prong, each of the pair of shorter or lower prongs not being directly underneath the longer or upper prong, but being arranged so as to stand obliquely thereto, or in a plane making an angle of about forty-five degrees with the plane of such longer prong, the whole being as represented in the figs. 1, 2, and 3, in which A is the longer or upper or hat-prong, and B and B' are the two shorter or lower or coat-prongs, all of such prongs being extended from a common centre-piece or plate C, formed with tapering holes $e\ e$ for the reception of screws, for the purpose of confining the hook to a wall.

Figure 6:
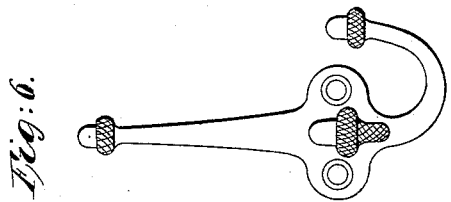

The new or tri-pronged hook, besides being more useful than the common or duplex-pronged hook shown in figs. 4 and 5, has the advantage of being able to be cast with screw-holes in it, whereas they have to be bored in the duplex-pronged hook after it may have been cast or founded. This operation of boring the holes causes the said duplex-pronged hook to cost more in its construction than the tri-pronged hook. Furthermore, when the lower prong of the hook slants obliquely to the upper one in manner represented, the upper one does not cover the lower one, or so extend over it as to be in the way of hooking a garment upon or unhooking it from such lower hook. Thus, it will be seen that with a hook made with but one lower prong, if such prong be so arranged with respect to the upper prong, such a hook would not only be superior to the common hook, having its lower prong directly underneath and in one plane with the upper hook, but could be cast with screw-holes in its shoulder-plate. Iron or brass-founders or other persons skilled in the art of making patterns for castings will easily comprehend how my improved hook, whether made with two or three prongs, can be moulded and founded. In fig. 6 I have represented a hook as made with two prongs, and with the lower arranged obliquely to the upper or hat-prong.

I have found that by arranging one or both of the lower or smaller prongs so as to stand obliquely to the larger or upper prong, the hook can be cast with holes in its fastening-plate. Therefore, what I claim as my invention, is as follows:

I claim the arrangement of the lower curved or coat-prong, so as to stand obliquely with the larger upper or hat-prong and the fastening-plate, substantially in manner as described.

I also claim the tri-pronged hook, as made with the hat-prong and the two coat-prongs, and with these latter arranged obliquely with respect to the fastening-plate and such hat-prong, and to project in opposite directions relatively to the latter, the whole being substantially as described and represented.

T. W. BROWN.

Witnesses:
R. H. EDDY,
F. P. HALE, Jr.